April 8, 1958  H. P. ROCKWELL, JR  2,829,519
SPRING TESTER

Filed Sept. 18, 1953  2 Sheets-Sheet 1

INVENTOR
HARVEY P. ROCKWELL JR
BY Herbert A. Minturn,
ATTORNEY

April 8, 1958  H. P. ROCKWELL, JR  2,829,519
SPRING TESTER
Filed Sept. 18, 1953  2 Sheets-Sheet 2

INVENTOR
HARVEY P. ROCKWELL JR.
BY Herbert A. Wintern
ATTORNEY ent Office 2,829,519
Patented Apr. 8, 1958

2,829,519

SPRING TESTER

Harvey P. Rockwell, Jr., Indianapolis, Ind.

Application September 18, 1953, Serial No. 380,951

4 Claims. (Cl. 73—161)

This invention relates to a device for checking springs of various sizes and amounts of deflection under given loads. For production purposes, springs are ordered from the manufacturer to have not only certain sizes and proportions, and be of certain materials, but also most importantly, to have a given deflection under a definite load. It is a purpose of this invention to provide a device for checking the springs in accordance with specifications particularly in regard to the deflection under load.

The invention involves the use of a linear variable differential transformer, wherein the core of the transformer is caused to travel a certain distance corresponding to the deflection of the spring under test, and employing the induced voltage in the transformer to be impressed in an electrical system setting up a predetermined drive to stop the travel of the transformer core at the end of the specific deflection of the spring; and which voltage maintains that deflection until the force required to produce it has been read; and then to permit the driving mechanism to be reversed in order to lift the core back to its initial "zero" position.

Within the electrical system, there is employed a two phase motor and the system is so designed that phases will be so shifted that the motor will be precisely controlled to stop at a predetermined deflection or lowering, relatively, of the transformer coil, this phase shifting being produced by the change in phase of the induced current coming from the transformer.

A primary object of the invention is to provide a structure of the above indicated construction to give an extremely high degree of accuracy and uniformity in results, and at the same time provide an exceedingly simple mechanical structure as well as electrical system.

It is a further important object of the invention to provide such a system as above outlined which may have the minimum amount of moving parts and wherein the pressure or forces required to produce the predetermined deflection of the spring may be read directly from a dial or scale indicating that force.

Figure 1:
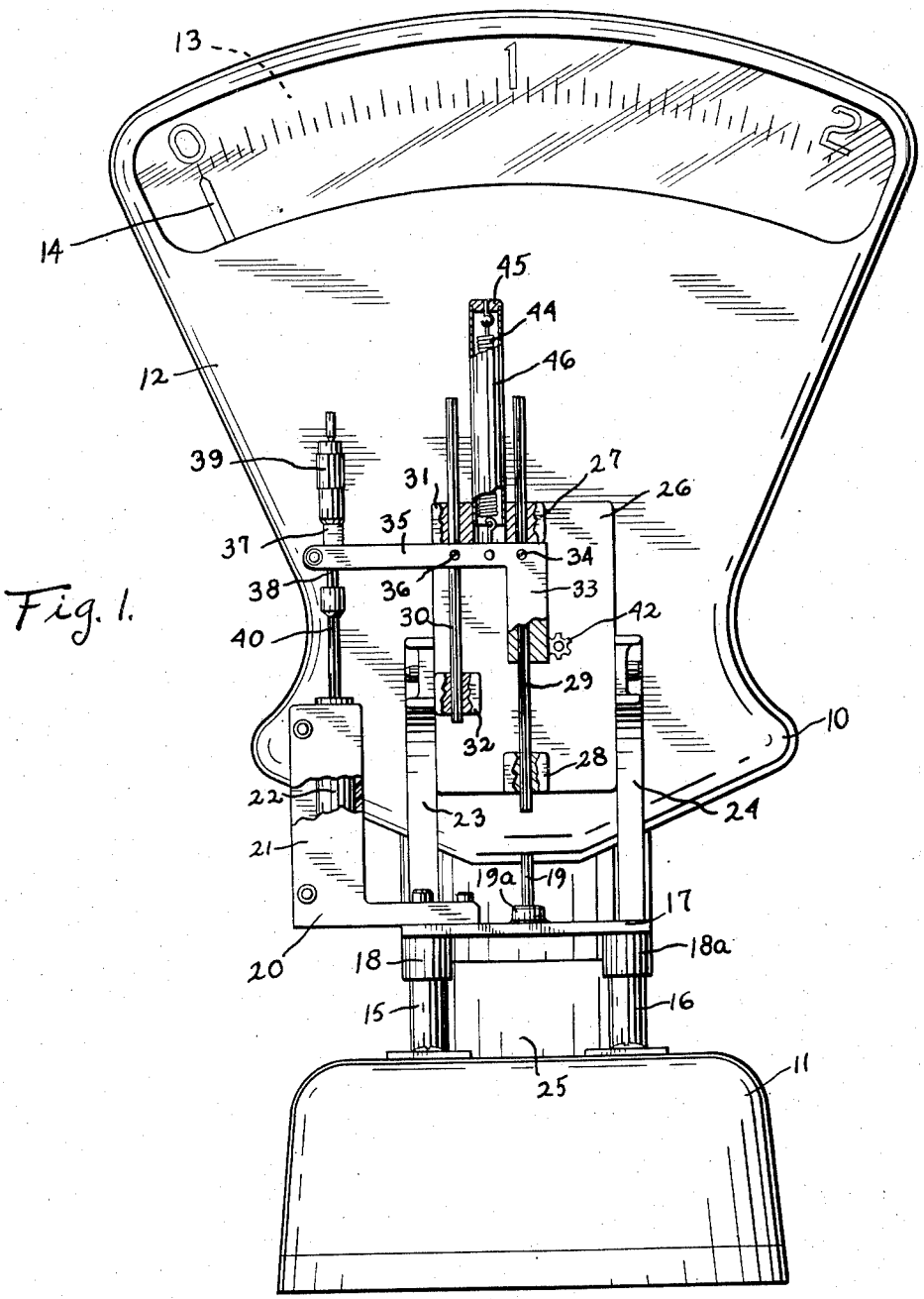
Figures 2, 3:
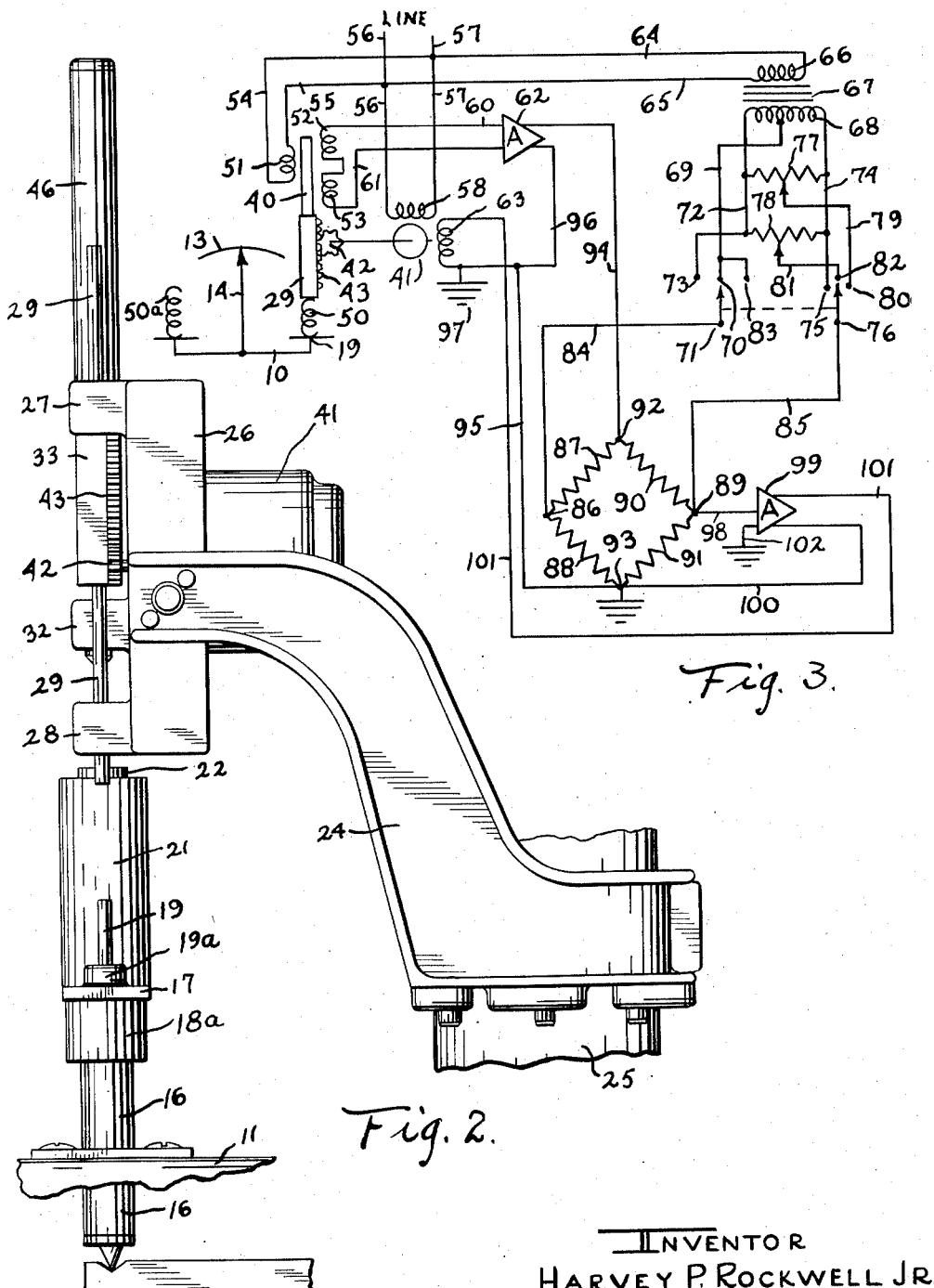

These and many other objects and advantages of the invention including the relatively low cost of production and also of actual usage, will become apparent to those versed in the art in the following description of one particular form of the invention as illustrated in the accompanying drawings, in which Fig. 1 is a view in front elevation and partial section of a structure embodying the invention;

Fig. 2 is a view in side elevation of the testing head only in the absence of the showing of the scale; and Fig. 3 is a diagrammatic illustration of the device and including a wiring diagram.

In the one particular form of the invention as herein shown and described, a weighing machine, popularly called a scale, herein designated in general by the numeral 10 is selected to have a base 11 with an upturned back portion 12 across which, at the upper end thereof appears a scale 13 across which a finger or arm 14 travels in accordance with the weight or pressure applied and being checked.

In the present application of the structure, the normally present pan is removed from the supporting posts 15 and 16. A bar 17 is provided with downturned cups 18 and 18a to telescope over the upper ends of these posts 15 and 16, and to rest thereon. From the top side of this bar 17 there extends upwardly a boss 19a which receives and supports a suitable anvil 19. There is further attached to the bar 17 a bracket 20 made out of any suitable non-magnetic material such as a plastic for example. This bracket 20 extends beyond one end of the bar 17 to have an upturned body 21 within which is inserted and clamped a cylindrical transformer body 22. The axis of the body 22 is vertically disposed. Thus, pressure applied to the bar 17 such as through the anvil 19, will deflect or lower the bar 17 and also the transformer body 22 a distance which will indicate a certain reading on the dial 13.

A head is provided to be in a fixed position relative to travel of the bar 17 and movement of the member 14. The head in the present showing comprises a pair of arms 23 and 24 fixed by lower and rear ends to the upright post 25 which carries the member 12. These arms 23 and 24 extend upwardly and forwardly to carry in a fixed manner by their upper forward ends a block 26.

This block 26 carries on its front side an upper and a lower projection 27 and 28 respectively through which vertically slides a rod or bar 29. This bar 29 is vertically and axially aligned with the axis of the anvil 19. Then to one side of the rod 29 there is carried in parallel relation thereto a second bar 30 slidable through the top and bottom guides 31 and 32 respectively extending forwardly from the block 26.

A bracket 33 is provided to receive the rod 29 therethrough to be fixed in relation to travel with the bracket 33 by any suitable means, such as by the screw 34. This bracket 33 has an arm 35 extending from its upper end portion substantially horizontally to the left as viewed in Fig. 1. The rod 30 extends through this arm 35 and is fixed thereto by any suitable means such as by the screw 36. Therefore the bracket 33 and the rods 29 and 30 travel vertically as a unit.

On the outer free end of the arm 35, there is fixed the head of a micrometer caliper 37, to have its axis vertically aligned with the axis of the transformer body 22. The stem or shaft 38 of the caliper 37 is free to be advanced vertically in reference to the arm 35 by turning the sleeve 39 in the usual manner. The lower end of the shaft 38 is fixed to the member 40 which constitutes the core of the transformer member 22, this core 40 being free to be shifted longitudinally of the body 22.

On the back side of the body 26, there is mounted and fixed thereto a two phase motor 41. This motor 41 has a driving shaft extending through the block 26 freely to carry on its front end a spur gear 42 which is constantly meshed with a rack gear 43, Fig. 2, fixed on the side of the bracket 33.

The bracket 33 with its attached elements 29, 30, 37, and 40, will be normally held in an uppermost position with the upper side of the bracket 33 and the arm 35 resting against the under sides of the members 27 and 31, this position of the bracket 33 being normally maintained by a spring 44 fixed by its upper end to a cap 45 on a tube 46, and through which tube 46 the spring extends downwardly to have its lower end engaged with the arm 35. This spring 44 will tend to resist any solenoid action of the core 40 in the member 22, and will also initially suspend the core 40 at a position above the null position of the core 40 in the member 22 as will hereinafter be more apparent. In any event, the spring 44 is quite "light" and requires but very little downward pressure on the bracket 33 to overcome its pull in the lowering of the bracket 33.

Referring to Fig. 3, the scale 10 is diagrammatically illustrated as carrying a spring 50 on the anvil 19 and the scale 10 being counter balanced by a like spring 50a. It is to be understood that the size of the anvil 19 may vary in accordance with the diameter or shape of the spring to be tested, the anvil 19 and the rod 29 thereabove having diameters for the testing of relatively small and minute springs, in the present form.

The transformer body 22 has a primary winding 51 and two secondary windings 52 and 53, these secondary windings being connected together in series. The core 40 may be shifted so that the voltage induced in the coils 52 and 53 may each be equal and out of phase so as to produce a zero output, at which condition, the core is in the null position. Shifting the core 40 will increase and decrease the output voltage from the secondaries in accordance with the direction of the shifting of the core. This is the construction and operation of the well known and commercially obtainable linear variable differential transformer.

The primary winding 51 is interconnected through the wires 54 and 55 directly to the supply voltage line wires 56 and 57 respectively. Normally there will be a switch in this supply line, not herein shown. Also connected with the line wires 56 and 57 is one of the windings 58 of the motor 41.

Output wires 60 and 61 lead from the outer terminals of the coils 52 and 53 to a voltage amplifier 62. The output voltage of the amplifier 62 is applied to the bridge at the terminal 92.

Wires 64 and 65 lead to the primary winding 66 in a transformer 67. These wires 64 and 65 lead respectively from the line wires 57 and 56. The secondary winding 68 of the transformer 67 is tapped intermediate its end terminals by a wire 69 which leads to a central tap 70 of a switch generally designated by the numeral 71. A wire 72 leads from one end of the transformer winding 68 to a tap 73 of the switch 71. A wire 74 leads from the other end of the winding 68 to a tap 75 of a second switch generally designated by the numeral 76.

Between the wires 72 and 74 there are resistances 77 and 78 connected in parallel. A wire 79 is variably interconnected with the resistance 77 and leads to a tap 80 in the switch 76. A wire 81 variably connected with the resistance 78 leads to the tap 82 of the switch 76. Switch 71 has a third tap 83 interconnected with the tap 70. The switch 71 may be operated to interconnect an output wire 84 with any one of the taps 70, 73, and 83, and in like manner a wire 85 is selectively interconnected through the switch 76 with the taps 80, 82, and 75. The two switches 71 and 76 are interconnected so as to operate in unison as indicated by the dash line interconnecting them.

The wire 84 leads to the terminal 86 which is the common terminal between the resistances 87 and 88. The wire 85 leads to the terminal 89 which is the common terminal of the two resistances 90 and 91. The resistances 87 and 90 are interconnected at a common terminal 92 and the resistances 88 and 91 are interconnected at a common terminal 93, these resistances being interconnected in the nature of a Wheatstone bridge. A wire 94 leads from the voltage amplifier 62 to the terminal 92. A wire 95 leads from the terminal 93 to a terminal of the motor winding 63. This wire 95 is grounded. The wire 96 interconnecting with the wire 95 and the amplifier 62 is also grounded at 97. A wire 98 leads from the terminal 89 to a voltage amplifier 99, one side of which from its output leads through the wire 100 to the terminal 93, and the other output side is interconnected through the wire 101 to the winding 63 of the motor 41. The amplifier 99 has the input ground connection 102.

Operation

The spring 50a is simply a counter balance of the spring 50 where, for example, in using the balance pan diagrammatically shown in Fig. 3, the spring 50a would simply be laid on the one pan and the spring 50 placed endwise on the other pan. In the standard type of scale 10 illustrated in Figs. 2 and 3, the spring 50 would be placed on the anvil 19 and its weight cancelled out by adjusting the needle 14 to zero. The anvil upon which the spring 50 rests is selected to be of that length for the particular size of spring being tested to permit the springs to be freely inserted between the anvil and the rod 29 when the rod is in its upper limit of travel.

The scale then reads "zero." The primary winding of the linear variable differential transformer is energized, and at the same time a known voltage is impressed upon the motor 41 through the wires 64 and 65 through the bridge composed of the resistances 87, 88, 90, and 91.

The motor 41 then drives the armature or core 40 downwardly in the body 22 thereby changing the coupling between the windings 51, 52, and 53 with a result that a voltage is put out therefrom and enters the bridge in opposition to the voltage or signal impressed on the bridge from the transformer 67. The system is so designed that this impressed voltage from the differential transformer will be sufficient to stop the motor 41 precisely at a given down travel of the rod 29. That is, when the core 40 is being withdrawn from its null position, the spring 50 is being compressed between the rod 29 and the anvil 19, and this compression is desired to be to a precise deflection, such by way of example as 0.1 inch. The travel of the core 40 will produce an output voltage directly in accordance with the deflection travel on the spring, this output being of a known value. This output voltage in accordance with the deflection of the spring may be very precisely developed through manipulation of the micrometer 37 for the proper positioning of the core 40 in the transformer.

When the spring is deflected, the arm 14 will travel over the dial 13 to register a given figure which may be directly read in terms of pounds pressure. Therefore the pounds per unit of deflection may be determined directly from reading the scale.

The positions of the switches 71 and 76 are those which will give a predetermined down travel of the motor 41 in accordance with an opposing voltage from the linear variable differential transformer to stop the motor 41 before the given deflection. For a different deflection, the switches 71 and 76 may be thrown to the contacts 83 and 80 before the impression of a different known signal on the motor 41 which will be opposed by a different voltage induced from the variable transformer, thereby stopping the motor 41 again as above indicated. To return the rod 29 to its upper position, the motor 41 is reversed in travel by throwing the switches 71 and 76 into contacts 73 and 75.

In short, the operation may be summed up to be the impressing on a motor of a given voltage signal to effect a drive of the motor, and then applying to that motor a signal generated by a member under travel induced by the motor travel and applying the induced voltage to the known voltage to counteract it and bring the motor to a stop at a precise point of travel of the generating device, the travel of the generating device being carried out in opposition to the resistance to deflection of the spring being tested to the end that the pressure on the spring is measured through a scale device in accordance with the previse deflection obtained.

The value of the known signal impressed on the motor 41 may be determined through adjustments of the variable resistances 77 and 78, whichever degree of deflection is to be used, and through selected values of the resistances 87, 88, 90 and 91. These values will depend upon the down displacement voltage set in by either resistors 77 or 78.

The wiring diagram herein shown is schematic and of course other means may be employed to achieve the same end of having a generated voltage as a signal oppose a predetermined signal in the drive of the motor.

Therefore, while I have herein shown and described my invention in the best form now known to me, it is obvious that, to those versed in the art, mechanical changes as well as electrical changes may be employed without departing from the spirit of the invention, such for example, the use of a direct current motor responsive to a rectified output signal, and I therefore do not desire to be limited to this precise form beyond the limitations which may be imposed by the following claims.

I claim:

1. A device for checking force required for unit deflection of a spring, comprising a force indicating structure; a spring supporting member shiftably carried by said structure yieldingly resisting shifting, travel of which member actuates said structure to cause it to indicate the force required to effect shifting of that member; a second member aligned with and shiftable toward and away from said supporting member to bear against and deflect a spring carried on said supporting member against the resistance to travel of the supporting member; a motor drivingly connected with said second member effecting said shifting thereof; a linear variable differential transformer having a primary winding and opposed secondary windings; a core shiftable relative to said secondary windings and influencing the output thereof by its travel; said core being fixedly interconnected with said second member, and all of said windings being supported in fixed relation to said first member; means impressing a voltage from a line on said primary winding; means energizing said motor from said line; an electrical network energized from said line and impressing a known second voltage on said motor; the output voltage of said secondary windings induced by travel of said core set up by travel of said second member being impressed upon said network in opposition to its said known voltage, stopping and maintaining said motor at the end of its drive for a given travel of said second member.

2. The structure of claim 1 in which means are incorporated to impress a voltage on said network overcoming the balance between said opposing voltages and reversing the motor to drive said second member to release the spring between it and the first member.

3. The structure of claim 2 in which network there is embodied means for impressing a second known value of voltage on said network requiring a different transformer output voltage for full opposition thereto.

4. A device for checking a spring force required to produce a given deflection, comprising a scale; a spring carrying member carried by the scale in yieldingly resistant travel under a load impressed thereon, said travel actuating the scale to indicate the magnitude of said load; a head mounted in fixed manner relative to said member; a second member reciprocally carried by said head for movement toward and away from said first member, pressing against the spring carried on the first member upon travel theretoward to apply said load; a linear differential transformer having a secondary output and carried by said first member; a shiftable transformer core traversing said transformer and carried by said second member to be movable relative to the transformer upon movement of the second member; a motor carried by said head; drive means between said motor and said second member; an electrical network interconnected with said motor; network means impressing a known voltage on said motor; the transformer secondary output being connected into said network to have its voltage opposed to said known voltage to stop said motor upon a predetermined voltage in said secondary output being induced by travel of said core of sufficient value to effect said motor stoppage.

References Cited in the file of this patent

UNITED STATES PATENTS

| | | |
|---|---|---|
| 2,088,372 | Gogan | July 27, 1937 |
| 2,156,877 | Simpson et al. | May 2, 1939 |
| 2,170,197 | Gumprich | Aug. 22, 1939 |
| 2,523,509 | Lilja | Sept. 26, 1950 |